(12) United States Patent
Sekiya et al.

(10) Patent No.: US 10,096,394 B2
(45) Date of Patent: Oct. 9, 2018

(54) ALUMINUM ALLOY WIRE ROD, ALUMINUM ALLOY STRANDED WIRE, COVERED WIRE AND WIRE HARNESS, AND METHOD OF MANUFACTURING ALUMINUM ALLOY WIRE ROD

(71) Applicants: FURUKAWA ELECTRIC CO., LTD., Tokyo (JP); FURUKAWA AUTOMOTIVE SYSTEMS INC., Shiga (JP)

(72) Inventors: Shigeki Sekiya, Tokyo (JP); Sho Yoshida, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 15/597,753

(22) Filed: May 17, 2017

(65) Prior Publication Data

US 2017/0250000 A1    Aug. 31, 2017

Related U.S. Application Data

(63) Continuation of application No. PCT/JP2015/084196, filed on Dec. 4, 2015.

(30) Foreign Application Priority Data

Dec. 5, 2014    (JP) ................................ 2014-247327

(51) Int. Cl.
*H01B 1/02*    (2006.01)
*C22C 21/08*    (2006.01)
(Continued)

(52) U.S. Cl.
CPC ............... *H01B 1/023* (2013.01); *B21C 1/02* (2013.01); *B22D 11/003* (2013.01);
(Continued)

(58) Field of Classification Search
CPC ................ H01B 1/023; H01B 13/0016; H01B 13/01209; B21C 1/02; B22D 11/003;
(Continued)

(56) References Cited

U.S. PATENT DOCUMENTS 9,263,167 B2    2/2016  Yoshida et al.
2011/0272175 A1  11/2011  Sekiya et al.
(Continued)

FOREIGN PATENT DOCUMENTS

CN    101994072 A    3/2011
CN    102264928 A    11/2011
(Continued)

OTHER PUBLICATIONS

International Search Report for PCT/JP2015/084196 (PCT/ISA/210) dated Mar. 8, 2016.
(Continued)

*Primary Examiner* — Timothy Thompson
*Assistant Examiner* — Charles Pizzuto
(74) *Attorney, Agent, or Firm* — Birch, Stewart, Kolasch & Birch, LLP

(57) ABSTRACT

An aluminum alloy wire rod having a composition including Mg: 0.10-1.00 mass %, Si: 0.10-1.00 mass %, Fe: 0.01-1.40 mass %, Ti: 0-0.100 mass %, B: 0-0.030 mass %, Cu: 0-1.00 mass %, Ag: 0-0.50 mass %, Au: 0-0.50 mass %, Mn: 0-1.00 mass %, Cr: 0-1.00 mass %, Zr: 0-0.50 mass %, Hf: 0-0.50 mass %, V: 0-0.50 mass %, Sc: 0-0.50 mass %, Sn: 0-0.50 mass %, Co: 0-0.50 mass %, Ni: 0-0.50 mass %, and the balance: Al and inevitable impurities, wherein a ratio of (standard deviation of crystal grain size of the aluminum
(Continued)

alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

10 Claims, 1 Drawing Sheet

(51) Int. Cl.
    *C22C 21/02*     (2006.01)
    *C22F 1/047*     (2006.01)
    *C22F 1/043*     (2006.01)
    *B22D 11/00*     (2006.01)
    *B21C 1/02*     (2006.01)
    *B60R 16/02*     (2006.01)
    *H01B 13/00*     (2006.01)
    *H01B 13/012*     (2006.01)
    *H01R 4/18*     (2006.01)

(52) U.S. Cl.
    CPC ........ *B22D 11/005* (2013.01); *B60R 16/0207* (2013.01); *C22C 21/02* (2013.01); *C22C 21/08* (2013.01); *C22F 1/043* (2013.01); *C22F 1/047* (2013.01); *H01B 13/0016* (2013.01); *H01B 13/01209* (2013.01); *H01R 4/18* (2013.01)

(58) Field of Classification Search
    CPC ... B22D 11/005; B60R 16/0207; C22C 21/02; C22C 21/08; C22F 1/043; C22F 1/047; H01R 4/18
    USPC ...................................................... 174/72 A
    See application file for complete search history.

(56) References Cited

U.S. PATENT DOCUMENTS

| | | |
|---|---|---|
| 2013/0264115 A1 | 10/2013 | Kobayashi et al. |
| 2015/0213913 A1 | 7/2015 | Yoshida et al. |
| 2015/0235729 A1 | 8/2015 | Yoshida et al. |

FOREIGN PATENT DOCUMENTS

| | | | | |
|---|---|---|---|---|
| EP | 2902017 A1 | 9/2015 | | |
| JP | 2004-134212 A | 4/2004 | | |
| JP | 5607853 B1 | 10/2014 | | |
| JP | 2015-124409 A | 7/2015 | | |
| JP | 2016044100 A | * 4/2016 | | |
| WO | WO 2012/141041 A1 | 10/2012 | | |
| WO | WO 2014/155819 A1 | 10/2014 | | |
| WO | WO 2014/155820 A1 | 10/2014 | | |
| WO | WO 2016093769 A1 | * 6/2016 | ............ | H01L 24/43 |
| WO | WO 2017095323 A2 | * 6/2017 | | |

OTHER PUBLICATIONS

Written Opinion of the International Searching Authority for PCT/JP2015/084196 (PCT/ISA/237) dated Mar. 8, 2016.
English translation of Written Opinion of the International Searching Authority; and International Preliminary Report on Patentability, dated Mar. 8, 2016, issued in PCT/JP2015/084196 (Forms PCT/ISA/237 and PCT/IB/373).
Extended European Search Report, dated May 23, 2018, for corresponding European Application No. 15864798.2.
Chinese Office Action and Search Report for corresponding Chinese Application No. 201580059392.1, dated May 14, 2018, with English translation.
Zuo et al., "Phase Constituents of Super High Strength Aluminum Alloy and the Ways to Control," Non-Ferrous Mining and Metallurgy, vol. 21, No. 2, Apr. 2005, pp. 29-32, with an English abstract.

* cited by examiner

ALUMINUM ALLOY WIRE ROD, ALUMINUM ALLOY STRANDED WIRE, COVERED WIRE AND WIRE HARNESS, AND METHOD OF MANUFACTURING ALUMINUM ALLOY WIRE ROD

CROSS REFERENCE TO RELATED APPLICATIONS

This is a continuation application of International Patent Application No. PCT/JP2015/084196 filed Dec. 4, 2015, which claims the benefit of Japanese Patent Application No. 2014-247327, filed Dec. 5, 2014, the full contents of all of which are hereby incorporated by reference in their entirety.

BACKGROUND

Technical Field

The present disclosure relates to an aluminum alloy wire rod used as a wire rod of an electric wiring structure, an aluminum alloy stranded wire, a covered wire and a wire harness, and a method of manufacturing an aluminum alloy wire rod.

Background Art

In the related art, a so-called wire harness has been used as an electric wiring structure for transportation vehicles such as automobiles, trains, and aircrafts, or an electric wiring structure for industrial robots. The wire harness is a member including electric wires each having a wire rod made of copper or copper alloy and fitted with terminals (connectors) made of copper or copper alloy (e.g., brass). With recent rapid advancements in performances and functions of automobiles, various electrical devices and control devices installed in vehicles tend to increase in number and electric wiring structures used for these devices also tend to increase in number. On the other hand, for environmental friendliness, lightweighting of transportation vehicles is strongly desired for improving fuel efficiency of transportation vehicles such as automobiles.

As one of the measures for achieving lightweighting of transportation vehicles, there have been, for example, continuous efforts in the studies of using aluminum or aluminum alloys as a wire rod of an electric wiring structure, which is more lightweight, instead of conventionally used copper or copper alloys. Since aluminum has a specific gravity of about one-third of a specific gravity of copper and has a conductivity of about two-thirds of a conductivity of copper (in a case where pure copper is a standard for 100% IACS, pure aluminum has approximately 66% IACS), an aluminum conductor needs to have a cross sectional area of approximately 1.5 times greater than that of a copper conductor to allow the same electric current as the electric current flowing through the copper conductor to flow through the pure aluminum conductor. Even an aluminum conductor having an increased cross section as described above is used, using an aluminum conductor is advantageous from the viewpoint of lightweighting, since an aluminum conductor has a mass of about half the mass of a pure copper conductor. It is to be noted that % IACS represents a conductivity when a resistivity $1.7241 \times 10^{-8}$ Ωm of International Annealed Copper Standard is taken as 100% IACS.

However, a pure aluminum wire rod, typically an aluminum alloy wire rod for transmission lines (JIS (Japanese Industrial Standard) A1060 and A1070), is generally known for being poor in its tensile durability, impact resistance, and bending characteristics. Therefore, for example, a pure aluminum wire rod cannot withstand a load abruptly applied by an operator or an industrial device while being installed to a car body, a tension at a crimping portion of a connecting portion between an electric wire and a terminal, and a repeated stress loaded at a bending portion such as a door portion. On the other hand, an alloyed material containing various additive elements added thereto is capable of achieving an increased tensile strength, but a conductivity may decrease due to a solution phenomenon of the additive elements into aluminum, and because of excessive intermetallic compounds formed in aluminum, a wire break due to the intermetallic compounds may occur during wire drawing. Therefore, it is essential to limit or select additive elements to provide sufficient elongation characteristics to prevent a wire break, and it is further necessary to improve impact resistance and bending characteristics while ensuring a conductivity and a tensile strength equivalent to those in the related art.

For example, aluminum alloy wire rods containing Mg and Si are known as aluminum alloy wire rods having such characteristics. A typical example of this aluminum alloy wire rod is a 6000 series aluminum alloy (Al—Mg—Si based alloy) wire rod. Generally, the strength of the 6000 series aluminum alloy wire rod can be increased by applying a solution treatment and an aging treatment.

A conventional 6000-series aluminum alloy wire used for an electric wiring structure of a transportation vehicle is described, for example, in Japanese Patent No. 5607853 proposed by the present applicant. The aluminum alloy wire described in Japanese Patent No. 5607853 is an aluminum alloy wire in which the crystal grain sizes at an outer periphery and an interior of the wire are controlled, such that even in the form of an extra fine wire, an aluminum alloy wire that has a high conductivity, a high bending fatigue resistance, an appropriate yield strength, and further a high extensibility can be achieved.

However, recently, for environmental friendliness, lightweighting of transportation vehicles is strongly required even in details for improving fuel efficiency of transportation vehicles such as automobiles, and the application of aluminum to small-diameter wires having smaller wire sizes is desired. A small-diameter wire is small in cross sectional area, and cannot with stand a line tension during manufacturing, or a load abruptly applied by an operator or an industrial device while being installed to a car body, and accordingly such a wire is more likely to break. Therefore, it has been difficult to use aluminum as a small-diameter electric wire for transportation vehicles. As described above, recently, wires may be used in severe applications that further require impact resistance. In such a case, there is a possibility that even the aluminum alloy wire rod described in Japanese Patent No. 5607853 might be unable to sufficiently fulfill the requirement, and there is a need for further improvement.

The present disclosure is related to providing an aluminum alloy wire rod having a high strength and an excellent impact resistance, and used as a wire rod of an electric wiring structure that is less likely to break, and capable of being used for a small-diameter wire, an aluminum alloy stranded wire, a covered wire and a wire harness, and a method of manufacturing an aluminum alloy wire rod.

The present inventors have carried out assiduous studies and reached the findings that an aluminum alloy wire rod provided with an excellent impact resistance while maintaining a high tensile strength can be manufactured by controlling heat treatment conditions during the manufacture of the aluminum alloy wire rod and by achieving an optimization of crystal grain structure, and on the basis of such findings, the present disclosure has been completed.

According to a first aspect of the present disclosure, an aluminum alloy wire rod having a composition consisting of or comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities, wherein a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

According to a second aspect of the present disclosure, a wire harness comprises a covered wire including a covering layer at an outer periphery of one of an aluminum alloy wire rod and an aluminum alloy stranded wire; and a terminal fitted at an end portion of the covered wire, the covering layer being removed from the end portion, wherein the aluminum alloy wire rod had a composition comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities, wherein a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

According to a third aspect of the present disclosure, a method of manufacturing an aluminum alloy wire rod comprises forming a drawing stock through hot working subsequent to melting and casting an aluminum alloy material having a composition comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities; and subsequently sequentially performing steps including a wire drawing step, an solution heat treatment and an aging heat treatment, wherein the solution heat treatment is performed by a two-stage heat treatment including a first step of heating to and retaining at a temperature of 300° C. to 400° C. and a second step of heating to 500° C. or higher.

It is to be noted that of the elements given the contents range in the chemical composition, any one of the elements each having a lower limit of the content described as "0 mass %" means a selective additive element to be optionally added if necessary. In other words, in a case where the content of a given additive element is "0 mass %," it means that such an additive element is not included.

According to the present disclosure, on the basis of the above-described constitution, it is possible to provide an aluminum alloy wire rod having a high strength and an excellent impact resistance, and used as a wire rod of an electric wiring structure that is less likely to break, and capable of being used for a small-diameter wire, an aluminum alloy stranded wire, a covered wire and a wire harness, and a method of manufacturing an aluminum alloy wire rod. The present disclosure is useful particularly as a battery cable, a harness or a conducting wire for a motor, equipped on a transportation vehicle, and as a wiring structure of an industrial robot. Moreover, since the aluminum alloy wire rod of the present disclosure has a high tensile strength and an excellent impact resistance, the wire size thereof can be made smaller than those of conventional wires.

DETAILED DESCRIPTION

Figure 1:
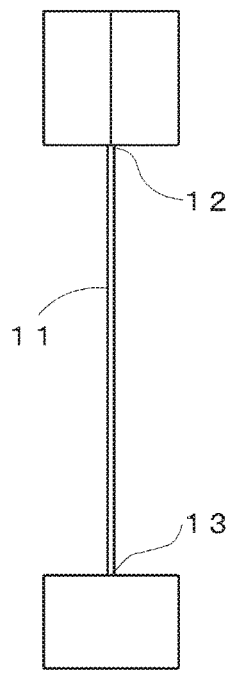
FIG. 1 is a diagram illustrating a load drop test, which is a method for evaluating the impact resistance of an aluminum alloy wire rod.
Figure 2:
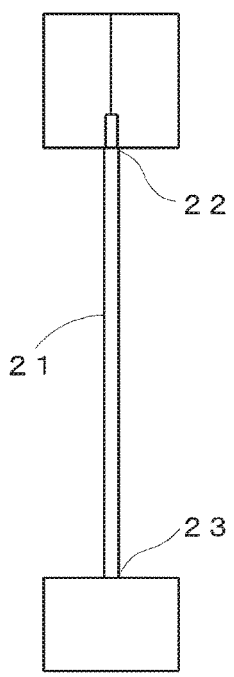
FIG. 2 is a diagram illustrating a load drop test, which is a method for evaluating the impact resistance of an electric wire crimped to a terminal.

The aluminum alloy wire rod of an embodiment of the present disclosure (hereinafter, simply referred to as "the present embodiment") has a composition consisting of or comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities, wherein a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

Hereinafter, reasons for limiting the chemical composition and the crystal grain size of the aluminum alloy wire rod of the present embodiment will be described.

(1) Chemical Composition

<Mg: 0.10 Mass % to 1.00 Mass %>

Mg (magnesium) is an element having an effect of strengthening by forming a solid solution in an aluminum matrix, and having an effect of improving the tensile strength by allowing a part of Mg to chemically combine with Si to form a precipitate. However, in a case where Mg content is less than 0.10 mass %, the above effects are insufficient, and in a case where Mg content is in excess of 1.00 mass %, conductivity decreases. Accordingly, the Mg content is 0.10 mass % to 1.00 mass %. The Mg content is, when a high strength is of importance, preferably 0.50 mass % to 1.00 mass %, and when a conductivity is of importance, preferably greater than or equal to 0.10 mass % and less than 0.50 mass %. Based on the points described above, the content of Mg is generally preferably 0.30 mass % to 0.70 mass %.

<Si: 0.10 Mass % to 1.00 Mass %>

Si (silicon) is an element having an effect of improving the tensile strength by chemically combining with Mg to form a precipitate. However, in a case where Si content is less than 0.10 mass %, the above effects are insufficient, and in a case where Si content is in excess of 1.00 mass %, conductivity decreases. Accordingly, the Si content is 0.10 mass % to 1.00 mass %. The Si content is, when high strength is of importance, preferably 0.50 mass % to 1.00 mass %, and in case where conductivity is of importance, preferably greater than or equal to 0.10 mass % and less than 0.50 mass %. Based on the points described above, the Si content is generally preferably 0.30 mass % to 0.70 mass %.

<Fe: 0.01 Mass % to 1.40 Mass %>

Fe (iron) is an element that contributes to refinement of crystal grains mainly by forming an Al—Fe based intermetallic compound and provides improved tensile strength. Fe dissolves in Al only by 0.05 mass % at 655° C., and even less at room temperature. Accordingly, the remaining Fe that cannot dissolve in Al will be crystallized or precipitated as an intermetallic compound such as Al—Fe, Al—Fe—Si, and Al—Fe—Si—Mg. This intermetallic compound contributes to the refinement of crystal grains and provides improved tensile strength. Further, Fe has, also by Fe that has dissolved in Al, an effect of providing an improved tensile strength. In a case where the Fe content is less than 0.01 mass %, these effects are insufficient, and in a case where the Fe content is in excess of 1.40 mass %, a wire drawing workability decreases due to coarsening of crystallized materials or precipitates, and the conductivity is also decreased. Therefore, the Fe content is 0.01 mass % to 1.40 mass %, and preferably 0.10 mass % to 0.70 mass %, and more preferably 0.10 mass % to 0.45 mass %.

The aluminum alloy wire rod of the present embodiment includes Mg, Si and Fe as essential components, and may further contain both or any one of Ti and B, and at least one of Cu, Ag, Au, Mn, Cr, Zr, Hf, V, Sc, Sn, Co and Ni, as necessary.

<Ti: 0.001 Mass % to 0.100 Mass %>

Ti (titanium) is an element having an effect of refining the structure of an ingot during dissolution casting. In a case where an ingot has a coarse structure, the ingot may crack during casting or a wire break may occur during a wire rod processing step, which is industrially undesirable. In a case where the Ti content is less than 0.001 mass %, the aforementioned effect cannot be achieved sufficiently, and in a case where Ti content exceeds 0.100 mass %, the conductivity tends to decrease. Accordingly, the Ti content is 0.001 mass % to 0.100 mass %, preferably 0.005 mass % to 0.050 mass %, and more preferably 0.005 mass % to 0.030 mass %.

<B: 0.001 Mass % to 0.030 Mass %>

Similarly to Ti, B (boron) is an element having an effect of refining the structure of an ingot during dissolution casting. In a case where an ingot has a coarse structure, the ingot may crack during casting or a wire break is likely to occur during a wire rod processing step, which is industrially undesirable. In a case where the B content is less than 0.001 mass %, the aforementioned effect cannot be achieved sufficiently, and in a case where the B content exceeds 0.030 mass %, the conductivity tends to decrease. Accordingly, the B content is 0.001 mass % to 0.030 mass %, preferably 0.001 mass % to 0.020 mass %, and more preferably 0.001 mass % to 0.010 mass %.

To contain at least one of <Cu: 0.01 mass % to 1.00 mass %>, <Ag: 0.01 mass % to 0.50 mass %>, <Au: 0.01 mass % to 0.50 mass %>, <Mn: 0.01 mass % to 1.00 mass %>, <Cr: 0.01 mass % to 1.00 mass %> and <Zr: 0.01 mass % to 0.50 mass %>, <Hf: 0.01 mass % to 0.50 mass %>, <V: 0.01 mass % to 0.50 mass %>, <Sc: 0.01 mass % to 0.50 mass %>, <Sn: 0.01 mass % to 0.50 mass %>, <Co: 0.01 mass % to 0.50 mass %> and <Ni: 0.01 mass % to 0.50 mass %>

Each of Cu (copper), Ag (silver), Au (gold), Mn (manganese), Cr (chromium), Zr (zirconium), Hf (hafnium), V (vanadium), Sc (scandium), Sn (tin), Co (cobalt) and Ni (nickel) is an element having an effect of refining crystal grains, and Cu, Ag and Au are elements further having an effect of increasing a grain boundary strength by being precipitated at a grain boundary. In a case where at least one of the elements described above is contained by 0.01 mass % or more, the aforementioned effects can be achieved, and a tensile strength and an elongation can be further improved. On the other hand, in a case where any one of Cu, Ag, Au, Mn, Cr, Zr, Hf, V, Sc, Sn, Co and Ni has a content exceeding the upper limit thereof mentioned above, a wire break is likely to occur since a compound containing such elements coarsens and deteriorates wire drawing workability, and also a conductivity tends to decrease. Therefore, the ranges of the contents of Cu, Ag, Au, Mn, Cr, Zr, Hf, V, Sc, Sn, Co and Ni are the ranges described above, respectively.

As for Fe, Ti, B, Cu, Ag, Au, Mn, Cr, Zr, Hf, V, Sc, Sn, Co and Ni, as the contents of these elements increase, the conductivity tends to decrease and the wire drawing workability tends to deteriorate. Therefore, it is preferable that a sum of the contents of these elements is less than or equal to 2.00 mass %. Since in the aluminum alloy wire rod of the present disclosure, Fe is an essential element, the sum of the contents of Fe, Ti, B, Cu, Ag, Au, Mn, Cr, Zr, Hf, V, Sc, Sn, Co and Ni is preferably 0.01 mass % to 2.0 mass %. The content of these elements is more preferably 0.05 mass % to 1.0 mass %. In a case where the above elements are added alone, the compound containing the element tends to coarsen more as the content increases. Since this may degrade wire drawing workability and a wire break is likely to occur, the content ranges of the respective elements are as specified above.

<Balance: Al and Inevitable Impurities>

The balance, i.e., components other than those described above, includes Al (aluminum) and inevitable impurities. Herein, inevitable impurities mean impurities contained by an amount which could be contained inevitably during the manufacturing process. Since inevitable impurities could cause a decrease in conductivity depending on a content thereof, it is preferable to suppress the content of the inevitable impurities to some extent considering the decrease in the conductivity. Components that may be inevitable impurities include, for example, Ga (gallium), Zn (zinc), Bi (bismuth), and Pb (lead).

(2) Crystal Grain Size

In the present disclosure, in addition to having the above-described chemical composition, it is required that a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10. In the present disclosure, by limiting to the configuration described above, an excellent impact resistance can be obtained while maintaining a high tensile strength. From the studies carried out by the present inventors, it has been found that an easiness of deformation of a material depends on the crystal grain size, and it has been found that in a case where the crystal grain structure is in a uniformly dispersed state, an excellent impact resistance is obtained. This is because in a case where the ratio of (standard deviation of crystal grain size of the aluminum alloy wire rod)/(average crystal grain size of the aluminum alloy wire rod) is greater than 0.57, deformation is likely to occur from large crystal grains and a wire break is likely to occur, and thus the aluminum alloy wire rod cannot be suitably used for a small-diameter electric wire for which an impact resistance is required. This is also because in a case where the ratio of (diameter of the aluminum alloy wire rod)/(average crystal grain size of the aluminum alloy wire rod) is less than 10, the crystal grain size is relatively large in relation to the wire size and nonuniformity of the deformation of the material appears significantly, and an impact resistance is decreased. "The standard deviation of the crystal grain size" and "the average crystal grain size" can be measured by the following method. First, a cross section of a material under test that has been cut out parallel to a lengthwise direction of the wire rod so as to include the central line of the wire rod is filled with a resin, subjected to mechanical polishing and then to electrolytic polishing. Then, the cross sectional structure of the material under test is imaged with an optical microscope at a magnification of 200× to 400×, and then a grain size measurement by cutting method in conformity with JIS H 0501-1986 (Methods for estimating average grain size of wrought copper and copper alloys) is performed. Specifically, in order to avoid any bias in the measurement, a straight line is drawn on a captured photograph to form an angle of 45° with the lengthwise direction of the wire rod, and a calculation value obtained by dividing a straight-line distance between grain boundaries intersecting the straight line by the imaging magnification was taken as a crystal grain size. By using this measurement method, for example, a crystal grain size for each of 50 crystal grains was obtained, and from the obtained crystal grains sizes (of the 50 crystal grains), a standard deviation and an average crystal grain size can be calculated. The crystal grain sizes (of 50 grain particles) can also be measured, for example, by using a plurality of straight lines and controlling the lengths and the number of the straight lines.

In Japanese Patent No. 5607853 1, the present inventors have disclosed a wire rod for an electric wiring structure in which the crystal grain structure in the outer periphery and the interior of the wire are controlled, thus exhibiting a high conductivity, a high bending fatigue resistance, an appropriate yield strength and a high extensibility. However, the above-described relation between the uniformity of the crystal grains and the impact resistance was not clear at the time of filing of Japanese Patent No. 5607853 1, and thus was not disclosed in Japanese Patent No. 5607853.

The aluminum alloy wire rod having such a crystal grain structure as described in the present embodiment can be achieved by controlling the manufacturing conditions and the like of the aluminum alloy wire rod as follows. Hereinafter, a description is made of a preferred method of manufacturing an aluminum alloy wire of the present embodiment.

(Method of Manufacturing the Aluminum Alloy Wire Rod According to an Example of Present Disclosure)

The aluminum alloy wire rod according to an Example of the present disclosure can be manufactured by a method of manufacturing an aluminum alloy wire rod including forming a drawing stock through hot working subsequent to melting and casting an aluminum alloy material having a composition consisting of or comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities; and subsequently, sequentially performing steps including a wire drawing step, a solution treatment and an aging heat treatment, wherein the solution heat treatment is performed by a two-stage heat treatment including a first step of heating to and retaining at a temperature of 300° C. to 400° C. and a second step of heating to 500° C. or higher.

Specific examples of the method of manufacturing an aluminum alloy wire rod of the present embodiment include a manufacturing method including sequentially performing each step of [1] melting, [2] casting, [3] hot working (such as grooved roll working), [4] first wire drawing, [5] intermediate heat treatment, [6] second wire drawing, [7] solution heat treatment, and [8] aging heat treatment. It is to be noted that a stranding step or a wire resin-covering step may be provided before or after the solution heat treatment or after the aging heat treatment. Hereinafter, steps of [1] to [8] will be described.

[1] Melting

In the melting step, a material is prepared by adjusting quantities of each component such that the aforementioned aluminum alloy composition is obtained, and the material is melted.

[2] Casting and [3] Hot Working (Such as Grooved Roll Working)

Subsequently, using a Properzi-type continuous casting rolling mill which is an assembly of a casting wheel and a belt, molten metal is cast with a water-cooled mold and continuously rolled to obtain a bar having an appropriate size of, for example, a diameter of 5 mmϕ to 13 mmϕ. A cooling rate during casting at this time is, from the viewpoint of preventing coarsening of Fe-based crystallized products and preventing a decrease in conductivity due to forced solid solution of Fe, preferably 1° C./s to 20° C./s, but it is not limited thereto. Casting and hot rolling may be performed by billet casting and an extrusion technique.

[4] First Wire Drawing

Subsequently, the bar is made into an appropriate size of, for example, 5 mmϕ to 12.5 mmϕ, and wire drawing is performed by cold rolling. The stripping of the surface is sometimes performed before wire drawing, to clean the surface, but does not need to be performed.

[5] Intermediate Heat Treatment

An intermediate heat treatment is applied to the work piece that has been subjected to cold drawing. As a heat treatment to soften the wire rod in order to recover the flexibility of the drawn wire rod hardened by processing, the wire rod is retained preferably at 300° C. to 450° C. The retention time is not particularly limited as long as a uniform heating is achieved, but a retention time of less than or equal to 5 hours is preferable in considering the productivity.

[6] Second Wire Drawing

After the intermediate heat treatment, wire drawing is further carried out in a cold processing.

[7] Solution Heat Treatment

A solution heat treatment is applied to the cold drawn work piece. The solution treatment is a process dissolving compounds of Mg and Si into aluminum. The solution heat treatment of the present disclosure is required to be performed by a two-stage heat treatment including a first step of heating to and retaining at a temperature of 300° C. to 400° C. and a second step of heating to a temperature of higher than or equal to 500° C. In a case where the heat treatment temperature of the first step is lower than 300° C., recrystallization is not sufficiently performed and a nonuniform crystal grain growth occurs in the second step, which causes a variation of the crystal grain size, and the impact resistance decreases. In a case where the heat treatment temperature of the first step is higher than 400° C., the crystal grain size becomes too large and the crystal grain size becomes relatively large in relation to the wire size of the wire rod in the second step, which also leads to a decrease in the impact resistance. The heat treatment time of the first step is preferably 10 minutes or more in order to suppress the variation of the crystal grain size, and, considering the productivity, it is preferably 5 hours or less. In a case where the heat treatment temperature of the second step is lower than 500° C., the solution treatment is not sufficiently performed, the strengthening by solid solution forming elements cannot be expected, and moreover, in the subsequent aging heat treatment, no sufficient precipitates are obtained and the strength is decreased. Accordingly, the solution heat treatment of the present disclosure is performed by a two-stage heat treatment including the first step of heating to and retaining at a temperature of 300° C. to 400° C. and the second step of heating to and retaining at a temperature of higher than or equal to 500° C. It is to be noted that in a case where the upper limit of the heat treatment temperature of the second step is higher than 580° C., melting occurs preferentially from the crystal grain boundary and the tensile strength and the impact resistance tend to decrease. Accordingly, the aforementioned upper limit is preferably 580° C.

The cooling in the solution heat treatment is preferably performed at an average cooling rate of greater than or equal to 10° C./s at least to a temperature of 200° C. This is because in a case where the average cooling rate is less than 10° C./s, the precipitates of Mg, Si and the like including $Mg_2Si$ are produced during cooling and the improvement effect of the tensile strength in the subsequently performed aging heat treatment will be limited. Thus, there is a tendency that no sufficient tensile strength is obtained. It is to be noted that the average cooling rate is preferably greater than or equal to 15° C./s, and more preferably greater than or equal to 20° C./s.

[8] Aging Heat Treatment

Subsequently, an aging heat treatment is applied. The aging heat treatment is performed in order to produce aggregates or precipitates of Mg and Si. The heating temperature in the aging heat treatment is preferably 100° C. to 250° C. In a case where the heating temperature is lower than 100° C., the aggregates or the precipitates of Mg and Si cannot be produced sufficiently, and the tensile strength and the conductivity tend to be insufficient. In a case where the heating temperature is higher than 250° C., the sizes of the precipitates of Mg and Si become too large. Accordingly, the conductivity increases, but the tensile strength tends to be insufficient. The heating temperature in the aging heat treatment is preferably 100° C. to 200° C. It is to be noted that as for the heating time, an optimal time varies depending on the temperature. For the purpose of improving the tensile strength, the heating time is preferably long when the temperature is low and the heating time is preferably short when the temperature is high. In consideration of the productivity, a short period of time is preferable, which is preferably 15 hours or less and more preferably 10 hours or less. It is to be noted that, in order to prevent dispersion of the properties, it is preferable to increase the cooling rate as much as possible in the cooling in the aging heat treatment. However, in a case where cooling cannot be performed quickly due to the manufacturing process, the aging conditions can be appropriately set in consideration of the occurrence of the variations of the precipitate amounts of Mg and Si during cooling.

A strand diameter of the aluminum alloy wire rod of the present embodiment is not particularly limited and can be determined appropriately according to the purpose of use. The strand diameter is preferably 0.10 mmϕ to 0.50 mmϕ for a fine wire, and 0.50 mmϕ to 1.50 mmϕ for a middle sized wire. The aluminum alloy wire rod of the present embodiment is advantageous in that the aluminum alloy wire rod can be used as a thin single wire as an aluminum alloy wire, but may also be used as an aluminum alloy stranded wire obtained by stranding a plurality of them together, and among the aforementioned steps [1] to [8] of the manufacturing method of the present disclosure, after bundling and stranding a plurality of aluminum alloy wires obtained by sequentially performing the respective steps [1] to [6], the steps of [7] the solution heat treatment and [8] the aging heat treatment may also be performed.

Also, in the present embodiment, such a homogenizing heat treatment as performed in the prior art may be further performed as an additional step after the continuous casting rolling. Since the homogenizing heat treatment can uniformly disperse the precipitates (mainly, Mg—Si-based compounds) of the added elements, it becomes easy to obtain a uniform crystal structure in the subsequent first heat treatment, and as a result, a high tensile strength and a satisfactory bendability are obtained more stably. The homogenizing heat treatment is performed preferably at a heating temperature of 450° C. to 600° C. and at a heating time of 1 hour to 10 hours, and more preferably at a heating temperature of 500° C. to 600° C. Also, the cooling in the homogenizing heat treatment is preferably a slow cooling at an average cooling rate of 0.1° C./min to 10° C./min because of the easiness in obtaining a uniform compound.

Also, the aluminum alloy wire rod of the present embodiment can be used as an aluminum alloy wire, or as an aluminum alloy stranded wire obtained by stranding a plurality of aluminum alloy wires, and may also be used as a covered wire having a covering layer at an outer periphery of the aluminum alloy wire or the aluminum alloy stranded wire, and, in addition, the aluminum alloy wire rod can also be used as a wire harness having a covered wire and a terminal fitted at an end portion of the covered wire, the covering layer being removed from the end portion. The aluminum alloy stranded wire of the present disclosure is preferably constituted in such a way that the wire break is not caused by a load of 2.94 N (300 gf) on the basis of a technique of evaluating the impact resistance, and additionally, the wire harness of the present disclosure is preferably constituted in such a way that the wire break is not caused by a load of 4.90 N (500 gf) on the basis of a technique of evaluating the impact resistance of an electric wire crimped to a terminal.

[Examples]

The present disclosure will be described in detail on the basis of the following examples. It is to be noted that the present disclosure is not limited to the examples described below.

(Examples and Comparative Examples)

Mg, Si, Fe, and Al, and selectively added Ti, B, Cu, Ag, Au, Mn, Cr, Zr, Hf, V, Sc, Sn, Co and Ni were placed in a Properzi-type continuous casting rolling mill such that the contents (mass %) were as shown in Table 1, thus a molten metal was prepared, and the molten metal containing these raw materials was continuously rolled while being cast with a water-cooled mold in the Properzi-type continuous casting rolling mill, and thus a bar of approximately 9.5 mmφ was obtained. The cooling rate during this casting was approximately 15° C./s. Then, the first wire drawing was applied, the intermediate heat treatment at 350° C. for 2 hours was applied, and the second wire drawing was further applied until a wire size of 0.31 mmφ was obtained. Then, the solution heat treatment was applied under the conditions shown in Table 2. Both in the intermediate heat treatment and in the solution heat treatment, the wire rod temperature was measured with a thermocouple wound around the wire rod. After the solution heat treatment, the aging heat treatment was applied under the conditions shown in Table 2, and an aluminum alloy wire was produced.

For each of the produced aluminum alloy wires of Examples and Comparative Examples, the respective characteristics were measured and evaluated by the methods shown below.

(A) Measurement of Standard Deviation of Crystal Grain Size and Average Crystal Grain Size The measurement of "the standard deviation of the crystal grain size" and "the average crystal grain size" was performed by the following method. The above-described measurement was performed as follows. First, a cross section of a material under test that has been cut out parallel to a lengthwise direction of the wire rod so as to include the central line of the wire rod was filled with a resin, subjected to mechanical polishing and then to electrolytic polishing. Then, the cross sectional structure of the material under test was imaged with an optical microscope at a magnification of 200× to 400×, and then a grain size measurement based on a cutting method in conformity with JIS H 0501-1986 (Methods for estimating average grain size of wrought copper and copper alloys) was performed. Specifically, in order to avoid any bias in the measurement, a straight line was drawn on a captured photograph to form an angle of 45° with the lengthwise direction of the wire rod, and a calculation value obtained by dividing a straight-line distance between grain boundaries intersecting the straight line by the imaging magnification was taken as a crystal grain size. By using this measurement method, for example, a crystal grain sizes for each of 50 crystal grains was obtained, and from the obtained crystal grain sizes (of the 50 crystal grains), a standard deviation and an average crystal grain size were calculated. The crystal grain sizes (of 50 grain particles) were measured, for example, by using a plurality of straight lines and controlling the lengths and the number of the straight lines.

(B) Measurement of Tensile Strength (TS)

In conformity with JIS Z 2241: 2011, a tensile test was carried out for each of three materials under test (aluminum alloy wires), and an average value of the measured tensile strength values was obtained. Also in the present disclosure, since a high tensile strength is required to make it usable without causing a wire break even when applied to a small-diameter wire having a small cross sectional area, a tensile strength of greater than or equal to 200 MPa was regarded as a pass level as in a conventional case.

(C) Measurement of Impact Resistance (I) of Aluminum Alloy Stranded Wire

As shown in FIG. 1, an aluminum alloy stranded wire 11 for which the aging heat treatment had been completed is fixed at one end 12 thereof and a weight of 300 g was attached to the other end 13 thereof. The length of the stranded wire from the one end 12 to the other end 13 was 300 mm. The weight was lifted up vertically to a height of 300 mm and then allowed to fall freely to test whether or not the stranded wire breaks and an impact resistance was evaluated. In Table 3, the impact resistance was regarded as acceptable when the stranded wire did not break and was marked with "○", and was regarded as an unacceptable product when the stranded wire broke and was marked with "x".

(D) Measurement of Impact Resistance (II) of Wire Harness

A terminal-fixed portion 22, whereto a terminal is crimped, of an aluminum electric wire 21 of a wire harness was fixed, and a weight of 500 g was attached to an electric wire end 23. The length of the electric wire from the terminal fixed portion 22 to the electric wire end 23 was 300 mm. The weight was lifted up vertically to a height of 300 mm and then allowed to fall freely to test whether or not the aluminum electric wire 21 breaks and the impact resistance was evaluated. In Table 3, the impact resistance was regarded as acceptable when the electric wire did not break and was marked with "○", and was regarded as an unacceptable product when the electric wire broke and was marked with "x".

The results obtained by measuring and evaluating Examples and Comparative Examples by the above-described methods are shown in Table 3.

TABLE 1

| | No. | Chemical composition (mass %) | | | | | | | | | | | | | | | | | |
| --- | --- | --- | --- | --- | --- | --- | --- | --- | --- | --- | --- | --- | --- | --- | --- | --- | --- | --- | --- |
| | | Mg | Si | Fe | Ti | B | Cu | Ag | Au | Mn | Cr | Zr | Hf | V | Sc | Sn | Co | Ni | Al |
| Example | 1 | 0.40 | 0.60 | 0.20 | 0.010 | 0.003 | — | — | — | — | — | 0.10 | — | — | — | — | — | — | Balance |
| | 2 | 0.50 | 0.50 | 0.20 | 0.010 | 0.003 | 0.20 | — | — | — | — | — | — | — | — | — | — | — | |
| | 3 | 0.60 | 0.40 | 0.20 | 0.010 | 0.003 | — | — | — | — | — | — | 0.05 | — | 0.05 | — | — | — | |
| | 4 | 0.60 | 0.60 | 0.20 | 0.010 | 0.003 | — | — | — | — | 0.05 | 0.10 | — | — | — | — | — | — | |
| | 5 | 0.60 | 0.60 | 0.20 | 0.010 | 0.003 | — | — | — | 0.05 | 0.05 | — | — | — | — | — | — | 0.05 | |
| | 6 | 0.60 | 0.60 | 0.20 | 0.010 | 0.003 | — | — | — | 0.05 | 0.05 | — | — | — | — | — | — | — | |
| | 7 | 0.60 | 0.60 | 0.20 | 0.010 | 0.003 | — | — | — | 0.07 | — | — | — | — | — | — | — | 0.10 | |
| | 8 | 0.60 | 0.60 | 0.20 | — | — | — | — | 0.05 | — | — | — | — | 0.05 | — | — | 0.05 | — | |
| | 9 | 0.60 | 0.60 | 0.20 | 0.010 | 0.003 | — | 0.05 | — | — | — | — | — | — | 0.05 | 0.05 | — | — | |
| Comparative Example | 1 | 0.50 | 0.57 | 0.22 | 0.010 | 0.003 | — | — | — | — | — | — | — | — | — | — | — | — | Balance |
| | 2 | 0.60 | 0.60 | 0.20 | 0.010 | 0.003 | 0.20 | — | — | — | 0.10 | — | — | — | — | — | — | — | |
| | 3 | 0.60 | 0.60 | 0.20 | 0.010 | 0.003 | — | — | — | 0.05 | — | — | — | — | — | — | — | — | |
| | 4 | 0.60 | 0.60 | 0.20 | — | — | — | — | — | — | — | — | — | — | — | — | — | — | |
| | 5 | 0.60 | 0.60 | 0.20 | 0.010 | 0.003 | — | — | — | — | — | — | — | — | — | — | — | — | |
| | 6 | 0.05 | 0.05 | 0.20 | 0.010 | 0.003 | 0.20 | — | — | — | — | 0.10 | — | — | — | — | — | — | |

N.B. Underlined numerical values in the table are out of appropriate range of the present invention.

TABLE 2

| | | Solution heat treatment conditions | | | | Aging heat treatment conditions | |
| --- | --- | --- | --- | --- | --- | --- | --- |
| | | First step | | Second step | | | |
| | | | | | | Average | |
| | No. | Heating temperature (° C.) | Heating time (h) | Heating temperature (° C.) | Heating time | cooling rate to 200° C. (° C/s) | Heating temperature (° C.) | Heating time (h) |
| Example | 1 | 300 | 2 | 500 | 2 h | 30 | 120 | 5 |
| | 2 | 350 | 2 | 540 | 1 h | 30 | 150 | 5 |
| | 3 | 300 | 2 | 570 | 1 h | 30 | 200 | 5 |
| | 4 | 350 | 2 | 500 | 1 h | 30 | 150 | 5 |
| | 5 | 300 | 2 | 500 | 2 h | 30 | 200 | 5 |
| | 6 | 350 | 2 | 540 | 2 h | 30 | 150 | 5 |
| | 7 | 350 | 2 | 540 | 2 h | 30 | 120 | 5 |
| | 8 | 400 | 2 | 570 | 2 h | 30 | 240 | 1 |
| | 9 | 350 | 2 | 570 | 2 h | 30 | 150 | 5 |
| Comparative Example | 1 | — | — | 550 | 0.36 s | 100 or more | 180 | 5 |
| | 2 | — | — | 580 | 10 min | 30 | 175 | 5 |
| | 3 | — | — | 580 | 0.13 s | 100 or more | 200 | 5 |
| | 4 | — | — | 580 | 1 h | 30 | 200 | 10 |
| | 5 | <u>460</u> | 2 | 540 | 2 h | 30 | 150 | 5 |
| | 6 | 350 | 2 | 500 | 2 h | 30 | 200 | 5 |

N.B. The underlined entries in the table are out of appropriate range of the present invention.

TABLE 3

| | No. | Ratio of (standard deviation of crystal grain size of Al alloy wire rod)/(average crystal grain size of Al alloy wire rod) | Ratio of (diameter of Al alloy wire rod)/(average crystal grain size of Al alloy wire rod) | Performance evaluation | | |
| --- | --- | --- | --- | --- | --- | --- |
| | | | | Tensile strength TS (MPa) | Impact resistance (I) | Impact resistance (II) |
| Example | 1 | 0.35 | 28.0 | 245 | ○ | ○ |
| | 2 | 0.43 | 22.0 | 253 | ○ | ○ |
| | 3 | 0.48 | 17.0 | 230 | ○ | ○ |
| | 4 | 0.36 | 26.0 | 255 | ○ | ○ |
| | 5 | 0.33 | 31.0 | 234 | ○ | ○ |
| | 6 | 0.39 | 26.0 | 353 | ○ | ○ |
| | 7 | 0.45 | 21.0 | 237 | ○ | ○ |
| | 8 | 0.55 | 13.0 | 205 | ○ | ○ |
| | 9 | 0.51 | 17.0 | 215 | ○ | ○ |
| Comparative Example | 1 | <u>0.63</u> | 14.0 | 302 | <u>x</u> | <u>x</u> |
| | 2 | <u>0.65</u> | <u>8.0</u> | 273 | <u>x</u> | <u>x</u> |
| | 3 | <u>0.63</u> | 33.0 | 315 | <u>x</u> | <u>x</u> |
| | 4 | <u>0.74</u> | <u>7.5</u> | <u>192</u> | <u>x</u> | <u>x</u> |
| | 5 | <u>0.72</u> | <u>7.0</u> | <u>168</u> | <u>x</u> | <u>x</u> |
| | 6 | <u>0.67</u> | 11.0 | <u>132</u> | <u>x</u> | <u>x</u> |

N.B. The underlined entries in the table are out of appropriate range of the present invention, or are of a rejection level with respect to the performance evaluation items concerned.

As can be seen from the results shown in Table 3, each of Examples 1 to 9 had the ratio of (standard deviation of the crystal grain size of the aluminum alloy wire rod)/(average crystal grain size of the aluminum alloy wire rod) and the ratio of (diameter of the aluminum alloy wire rod)/(average crystal grain size of the aluminum alloy wire rod) both falling within the scope of the present disclosure, respectively, and accordingly was excellent in each of the tensile strength of the aluminum alloy wire rod, the impact resistance (I) of the aluminum alloy stranded wire and the impact resistance (II) of the wire harness. On the other hand, each of Comparative Examples 1 to 6 had at least one of the ratio of (standard deviation of crystal grain size of the aluminum alloy wire rod)/(average crystal grain size of the aluminum alloy wire rod) and the ratio of (diameter of the aluminum alloy wire rod)/(average crystal grain size of the aluminum alloy wire rod), falling outside the scope of the present disclosure, and accordingly was poor both in the impact resistance (I) of the aluminum alloy stranded wire and in the impact resistance (II) of the wire harness, and further, each of Comparative Examples 4 to 6 was also poor in the tensile strength.

According to the present disclosure, on the basis of the above-described constitution, it is possible to provide an aluminum alloy wire rod having a high strength and an excellent impact resistance, and used as a wire rod for an electric wiring structure that is less likely to break, and capable of being used for a small-diameter wire, an aluminum alloy stranded wire, a covered wire and a wire harness, and a method of manufacturing an aluminum alloy wire rod. The present disclosure is useful particularly as a battery cable, a harness or a conducting wire for a motor, equipped on a transportation vehicle, and as a wiring structure of an industrial robot. Moreover, since the aluminum alloy wire rod of the present disclosure has a high tensile strength and an excellent impact resistance, the wire size thereof can be made smaller than those of conventional electric wires.

What is claimed is:

1. An aluminum alloy wire rod having a composition comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities,
wherein a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

2. The aluminum alloy wire rod according to claim 1, wherein the composition comprises both of or any one of Ti: 0.001 mass % to 0.100 mass % and B: 0.001 mass % to 0.030 mass %.

3. The aluminum alloy wire rod according to claim 1, wherein the composition comprises at least one of Cu: 0.01 mass % to 1.00 mass %, Ag: 0.01 mass % to 0.50 mass %, Au: 0.01 mass % to 0.50 mass %, Mn: 0.01 mass % to 1.00 mass %, Cr: 0.01 mass % to 1.00 mass %, Zr: 0.01 mass % to 0.50 mass %, Hf: 0.01 mass % to 0.50 mass %, V: 0.01 mass % to 0.50 mass %, Sc: 0.01 mass % to 0.50 mass %, Sn: 0.01 mass % to 0.50 mass %, Co: 0.01 mass % to 0.50 mass % and Ni: 0.01 mass % to 0.50 mass %.

4. The aluminum alloy wire rod according to claim 1, wherein the aluminum alloy wire rod is an aluminum alloy wire rod having a diameter of 0.10 mm to 0.50 mm.

5. An aluminum alloy stranded wire comprising a plurality of the aluminum alloy wire rods as claimed in claim 1, the aluminum alloy wire rods being stranded together.

6. The aluminum alloy stranded wire according to claim 5, wherein no wire break is caused by a load of 2.94 N (300 gf) with a technique of evaluating an impact resistance of the aluminum alloy stranded wire.

7. A covered wire comprising a covering layer at an outer periphery of the aluminum alloy stranded wire as claimed in claim 5.

8. A covered wire comprising a covering layer at an outer periphery of one of the aluminum alloy wire rod as claimed in claim 1.

9. A wire harness comprising:
a covered wire including a covering layer at an outer periphery of one of an aluminum alloy wire rod and an aluminum alloy stranded wire; and
a terminal fitted at an end portion of the covered wire, the covering layer being removed from the end portion,
wherein the aluminum alloy wire rod had a composition comprising Mg: 0.10 mass % to 1.00 mass %, Si: 0.10 mass % to 1.00 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Sn: 0 mass % to 0.50 mass %, Co: 0 mass % to 0.50 mass %, Ni: 0 mass % to 0.50 mass %, and the balance: Al and inevitable impurities,
wherein a ratio of (standard deviation of crystal grain size of the aluminum alloy wire rod)/(average crystal grain size of the aluminum alloy wire rod) is less than or equal to 0.57, and a ratio of (diameter of the aluminum alloy wire rod)/(average crystal grain size of the aluminum alloy wire rod) is greater than or equal to 10.

10. The wire harness according to claim 9, wherein no wire break is caused by a load of 4.90 N (500 gf) with a technique of evaluating an impact resistance of an electric wire whereto a terminal is crimped.

* * * * *